US012621630B2

(12) United States Patent
Johnston

(10) Patent No.: US 12,621,630 B2
(45) Date of Patent: May 5, 2026

(54) SYSTEM AND METHOD FOR AUDIO DIFFUSOR

(71) Applicant: Spotify AB, Stockholm (SE)

(72) Inventor: James David Johnston, Redmond, WA (US)

(73) Assignee: Spotify AB, Stockholm (SE)

( * ) Notice: Subject to any disclaimer, the term of this patent is extended or adjusted under 35 U.S.C. 154(b) by 146 days.

(21) Appl. No.: 18/291,998

(22) PCT Filed: Jul. 25, 2022

(86) PCT No.: PCT/US2022/038137

§ 371 (c)(1),
(2) Date: Jan. 25, 2024

(87) PCT Pub. No.: WO2023/009414

PCT Pub. Date: Feb. 2, 2023

(65) Prior Publication Data

US 2024/0323637 A1 Sep. 26, 2024

(51) Int. Cl.
*H04S 7/00* (2006.01)
*H04S 1/00* (2006.01)

(52) U.S. Cl.
CPC .............. *H04S 7/307* (2013.01); *H04S 1/007* (2013.01); *H04S 2400/13* (2013.01)

(58) Field of Classification Search
CPC ............. H04S 7/306-307; H04S 1/007; H04S 2400/13
See application file for complete search history.

(56) References Cited

U.S. PATENT DOCUMENTS

2007/0172086 A1* 7/2007 Dickins .................. H04S 3/004 381/309
2011/0305345 A1 12/2011 Bouchard et al.
2012/0082319 A1 4/2012 Jot et al.
(Continued)

FOREIGN PATENT DOCUMENTS

WO WO/2010/129241 A1 11/2010

OTHER PUBLICATIONS

Notification of Transmittal of the International Search Report and The Written Opinion of the International Search Authority—The Korea Intellectual Property Office—mailed Nov. 14, 2022 for PCT/US22/38137, 12 pages.
(Continued)

*Primary Examiner* — James K Mooney
(74) *Attorney, Agent, or Firm* — Morgan, Lewis & Bockius LLP

(57) ABSTRACT

A system for processing audio data, comprising a diffusion data filter coupled to a source of digital audio data, the diffusion data filter configured to generate filtered audio data from the digital audio data. A delay coupled to the source of digital audio data, the delay configured to delay the digital audio data by a predetermined amount. A first multiplier configured to multiply the filtered audio data by a distance gain parameter to generate a first intermediate output. A second multiplier configured to multiply the delayed digital audio data by a complementary distance gain parameter to generate a second intermediate output. An adder configured to add the first intermediate output and the second intermediate output to generate an audio output.

16 Claims, 3 Drawing Sheets

(56) References Cited

U.S. PATENT DOCUMENTS

| | | | | |
|---|---|---|---|---|
| 2012/0155652 | A1 | 6/2012 | Vickers | |
| 2012/0263311 | A1 | 10/2012 | Neugebauer et al. | |
| 2016/0234621 | A1 | 8/2016 | Faller et al. | |
| 2019/0313201 | A1 * | 10/2019 | Torres | H04R 5/04 |
| 2021/0204073 | A1 | 7/2021 | Elmedyb et al. | |

OTHER PUBLICATIONS

Notification of Transmittal of the International Preliminary Report on Patentability mailed Feb. 8, 2024 from the International Bureau of WIPO for PCT/US22/38137, 5 pages.

Immersion Networks, Inc., Extended European Search Report, EP22850127.6, Aug. 14, 2025, 8 pgs.

* cited by examiner

400

SYSTEM AND METHOD FOR AUDIO DIFFUSOR

TECHNICAL FIELD

The present disclosure relates generally to audio data processing, and more specifically to a system and method for an audio diffusor that creates a spatial image external to the headphone listener.

BACKGROUND OF THE INVENTION

The ability to reproduce digitally-encoded audio data in a manner that sounds like a natural source external to the headphone listener is limited by the lack of acoustic artifacts particular to air propagation, especially in moving air.

SUMMARY OF THE INVENTION

A system for processing audio data is disclosed that includes a diffusion filter coupled to a source of digital audio data, where the diffusion filter generates filtered audio data from the digital audio data. A delay is coupled to the source of digital audio data and delays the digital audio data by a predetermined amount. A first multiplier multiplies the filtered audio data by a distance gain parameter to generate a first intermediate output and a second multiplier multiplies the delayed digital audio data by the compliment of the distance gain parameter to generate a second intermediate output. An adder combines the first intermediate output and the second intermediate output to generate an audio output.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
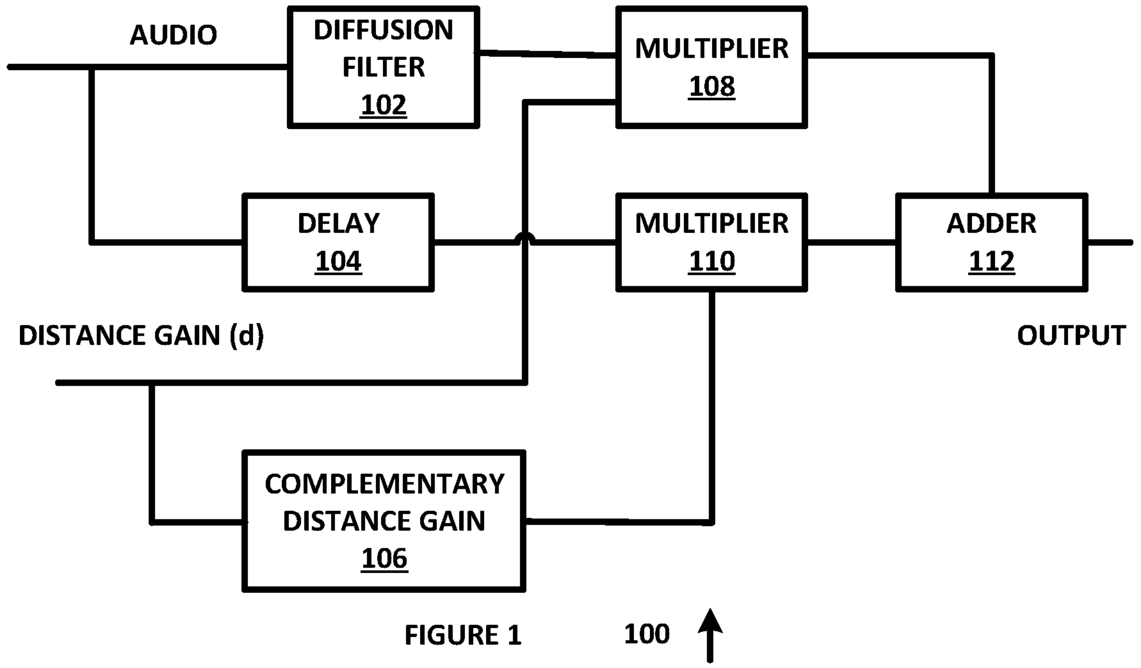
FIG. 1 is a diagram of a system for generating a diffused audio signal from digitally encoded audio data, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

FIG. 1 is a diagram of a system 100 for generating a diffused audio signal from digitally encoded audio data, in accordance with an example embodiment of the present disclosure. System 100 includes diffusion filter 102, delay 104, complementary distance gain 106, multiplier 108, multiplier 110 and adder 112, each of which can be implemented in hardware or a suitable combination of hardware and software, such as one or more algorithms operating on an audio data processor.

Diffusion filter 102 can be implemented as one or more algorithms operating on an audio data processor that is configured to receive digitally-encoded audio data and to perform diffusion filtering of the digitally encoded audio data to generate filtered audio data. In one example embodiment, the filter applied by diffusion filter 102 can be configured to change dynamically, so as to create a time varying audio data signal that causes a listener to perceive the audio signal differently from a non-time-varying audio data signal. In this example, the perception of the listener can be that the audio data is from a natural source as opposed to a recording, such as a source that is located in a space outside of the apparent space that the listener experiences from recorded audio played over headphones. In particular, the creation of this filter specifically addresses the perception of air movement in a listening room, by moving parts of the signal both earlier and later than the mean path from the source to the listener, thereby simulating the sensation resulting from the actual acoustics in the room with moving air currents due to audience, heat, convection, HVAC, and the like. In this manner, signals can come both earlier than and later than the mean free path, which provides the desired effect. When a filter is created in this fashion, the amount of other signal modification is substantially reduced as compared to other methods, and the impairment to the audio is therefore substantially smaller. Diffusion filter 102 can be implemented using a finite impulse response (FIR) filter or in other suitable manners.

Delay 104 can be implemented as one or more algorithms operating on an audio data processor that is configured to receive digitally-encoded audio data and to delay the digitally-encoded audio data by a predetermined time period without causing any other substantive changes to the digitally-encoded audio data. In one example embodiment, the delay can be equal to the delay created by processing of the digitally-encoded audio data by diffusion filter 102 or other suitable delays.

Complementary distance gain 106 can be implemented as one or more algorithms operating on an audio data processor that is configured to receive a digitally encoded distance gain data value that varies between 0 and 1 and subtracts it from 1, in order to create a complementary distance gain data value. In one example embodiment, complementary distance gain 106 can be used to create a processed distance gain data signal that is coordinated with an input distance gain data signal, where the two distance gain data signals are complementary for the purposes of creating a diffused audio signal. When used as shown and described herein, the complementary distance gain data signals create an effect on a listener to allow the listener to perceive that audio signals are being received from a natural external source whose distance from the head can be varied, as opposed to being generated from a space that lies inside the listener's head.

Multiplier 108 can be implemented as one or more algorithms operating on an audio data processor that is configured to receive filtered digitally-encoded audio data from diffusion filter 102 and a digitally encoded distance gain data value that varies between 0 and 1 and to multiply the two signals to generate a filtered output signal that is used to generate diffused audio data. In one example embodiment, multiplier 108 can be used to create a processed audio data signal that is coordinated with a delayed audio data signal, where the two audio data signals are complementary for the purposes of creating a diffused audio signal. When used as shown and described herein, the complementary audio data signals create an effect on a listener to allow the listener to perceive that audio signals are being received from a natural source external to the listener, as opposed to be generated from a recording.

Multiplier 110 can be implemented as one or more algorithms operating on an audio data processor that is configured to receive delayed digitally-encoded audio data from delay 104 and a complementary digitally encoded distance gain data value that varies between 0 and 1 and to multiply the two signals to generate a delayed output signal that is used to generate diffused audio data. In one example embodiment, multiplier 110 can be used to create a delayed audio data signal that is coordinated with a processed audio data signal, where the two audio data signals are complementary for the purposes of creating a diffused audio signal. When used as shown and described herein, the complementary audio data signals create an effect on a listener to allow the listener to perceive that audio signals are being received from a natural source external to the listener, as opposed to be generated from a recording. As the gain from the filtered version increases, and the gain from the delayed version is reduced, the sensation of the listener is of the source becoming more and more distant. Other processing, not in the scope of this patent, also may create a sense of distance at far distances, however the diffusion process can be used to assure that the source sounds as if it is outside of the headphone listener's head.

Adder 112 can be implemented as one or more algorithms operating on an audio data processor that is configured to combine complementary audio data signals to generate a diffused audio signal. When used as shown and described herein, the diffused audio signal creates an effect on a listener to allow the listener to perceive that the audio signal is being received from a natural source external to the listener as determined by distance gain data 'd', as opposed to be generated from a recording.

In operation, system 100 improves the perceived quality of digitally-encoded audio data by creating a diffused audio signal that the user perceives as being similar to audio data from a natural source external to the listener, and outside the headphone listener's head. For example, a user listening to audio over headphones typically experiences the audio source as being in the space "between the ears," as opposed to being in the space outside of the user's head. While this spatial effect does not make the audio listening experience unpleasant, it is different from what the user is used to. In addition, by moving the apparent spatial location of the audio data to a different location than the listener would otherwise experience, it is possible to combine audio signals with different perceived spatial locations, which can objectively increase the quality of the listening experience.

Figure 2:
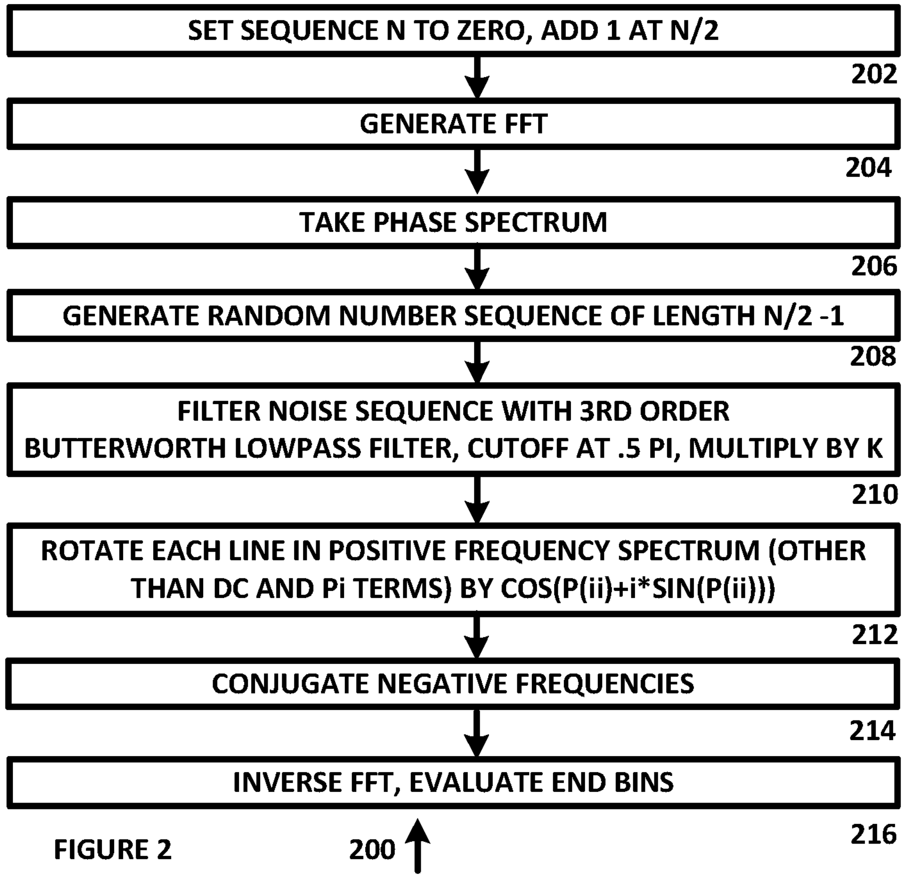
FIG. 2 is a diagram of an algorithm for generating filter components for generating a diffused audio signal, in accordance with an example embodiment of the present disclosure.

FIG. 2 is a diagram of an algorithm 200 for generating filter components for processing a diffused audio signal, in accordance with an example embodiment of the present disclosure. Algorithm 200 can be implemented in hardware or a suitable combination of hardware and software.

Algorithm 200 begins at 202, where a sequence of per unit magnitude values for N digital data values is set to zero, and where a per unit magnitude of 1 is added to the value at N/2. The algorithm then proceeds to 204.

At 204, a fast Fourier transform (FFT) is generated of the sequence of N digital data values. The algorithm then proceeds to 206.

At 206, the phase spectrum of the FFT data is isolated. The algorithm then proceeds to 208.

At 208, a random number sequence of length N/2−1 is generated. The algorithm then proceeds to 210.

At 210, a noise sequence is filtered with a $3^{rd}$ order Butterworth lowpass filter having a cutoff at 0.5 Π, and the result is multiplied by a constant K. The algorithm then proceeds to 212. In addition, the mean is removed from the sequence after low-pass filtering, in order to avoid time-shifting the center of the filter design, resulting in P(ii) where ii is the frequency index of the FFT.

At 212, each line in a positive frequency spectrum of the phase spectrum of the FFT data (other than DC and Π terms) is rotated by (COS(P(ii)+iSIN(Pii))). The algorithm then proceeds to 214. Note that for a stereo source, a second filter for the other channel can be conveniently created at the same time by rotating the signal by −P(ii) instead of P(ii).

At 214, the negative frequencies of the modified FFT data are conjugated. The algorithm then proceeds to 216.

At 216, an inverse FFT is performed on the processed FFT data, and the end bins are evaluated to determine if they are above a predetermined value. If they are, then the bin magnitude data values can be reduced to a predetermine value, such as near zero by reducing the phase noise (P(ii)) by a multiplicative factor, or by reducing the bandwidth of the lowpass filter, or both. When the necessary end conditions are achieved the algorithm then ends. This process maintains the near-allpass character of the filter, by controlling artifacts created by the periodic nature of the FFT/IFFT.

In operation, algorithm 200 generates filter components for processing a diffused audio signal, such as for use in an FIR filter of an audio data processing system or for other suitable applications. Although algorithm 200 is shown in flowchart format, a person of skill in the art will recognize that some or all of algorithm 200 can also or alternatively be implemented using object-oriented programming, state diagrams, ladder diagrams, a combination of such programming conventions or in other suitable manners. Note also that a filter for a second stereo channel can be created by time-reversing the filter, being sure to maintain the correct center point of the filter, either by reversing the phase component, or by time-reversing the actual time domain filter.

Figure 3:
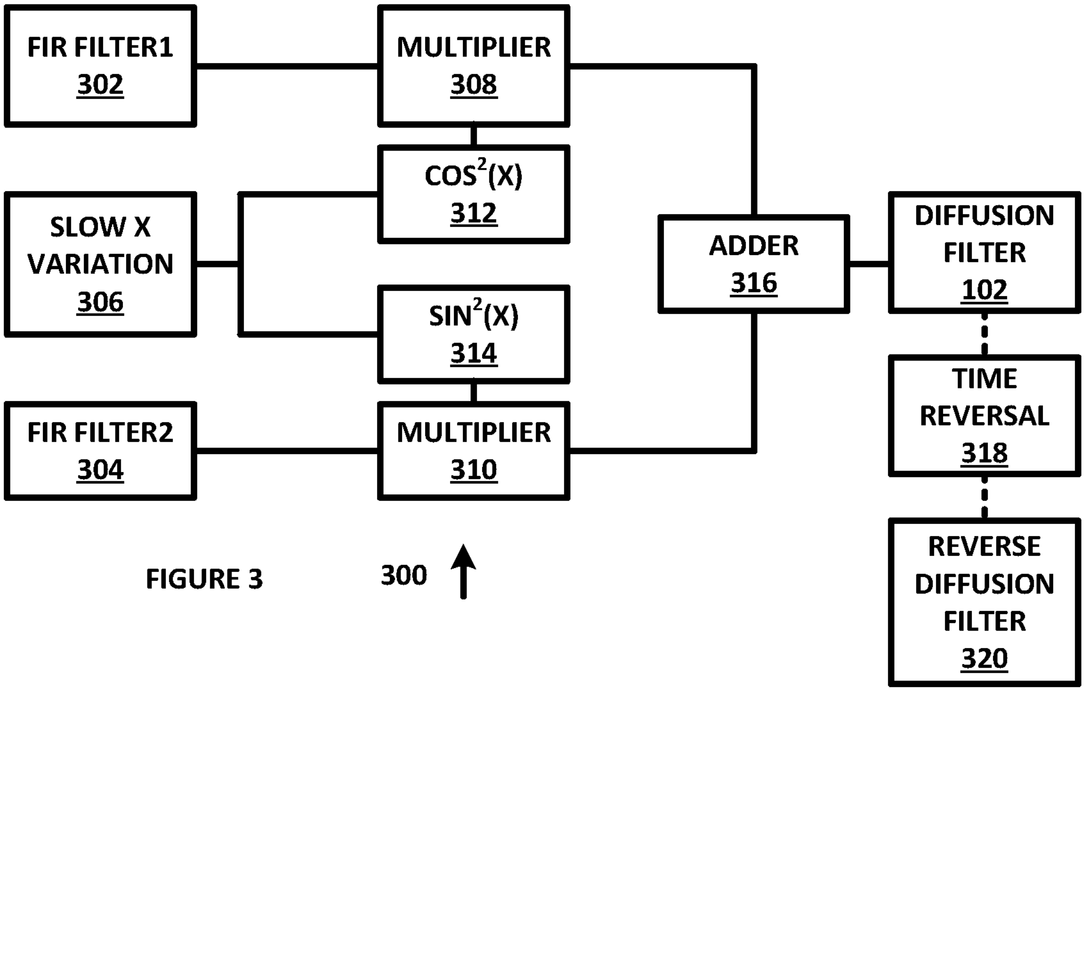
FIG. 3 is a diagram of a system for generating filter components for generating a diffused audio signal, in accordance with an example embodiment of the present disclosure.

FIG. 3 is a diagram of a system 300 for generating filter components for processing a diffused audio signal, in accordance with an example embodiment of the present disclosure. System 300 includes FIR filter 1 302, FIR filter 2 304, slow X variation 306, multiplier 308, multiplier 310, $COS^2(x)$ 312, $SIN^2(x)$ 314, adder 316, diffusion filter 102, inverter 318 and reverse diffusion filter 320, each of which can be implemented in hardware or a suitable combination of hardware and software, such as one or more algorithms operating on an audio data processor. In this process, 2 filters, generated as in 200, but using different and independently created noise sources, are used to create a time varying filter. That time-varying filter can then be used in FIG. 1 as the filter, varied on a per-sample basis, or in other suitable embodiments.

FIR filter 1 302 can be implemented as one or more on an audio data processor that is algorithms operating configured to perform near all-pass frequency band filtering between predetermined frequency end points or in other suitable manners. FIR filter 1 can be generated by the process in 200 or in other suitable manners.

FIR filter 2 304 can be implemented as one or more algorithms operating on an audio data processor that is configured to perform near all-pass frequency band filtering between predetermined frequency end points or in other suitable manners. FIR filter 2, like FIR filter 1, can be generated with an independent, different source of noise as the input to the phase noise calculation.

Slow X variation 306 can be implemented as one or more algorithms operating on an audio data processor that is configured to generate a time carrying data value that can be used to generate a variable FIR configuration. In one example embodiment, the data generated by slow X variation 306 can vary from −pi to pi or other suitable values. Other ways to create a slowly varying value between 0 and 1, and its corresponding value of 1 to 0, the two summing to one, can be used, including but not limited to random variations.

Multiplier 308 can be implemented as one or more algorithms operating on an audio data processor that is configured to receive FIR filter 1 302 configuration data and to multiply the FIR filter 1 302 configuration data by a time varying value generated by $COS^2(x)$ 312 to generate modified FIR filter 1 302 coefficients. In one example embodiment, multiplier 308 can operate continually on serial FIR filter 1 302 coefficients, can operate periodically on the entire set of FIR filter 1 302 coefficients, or can be configured in other suitable manners.

Multiplier 310 can be implemented as one or more algorithms operating on an audio data processor that is configured to receive FIR filter 2 304 configuration data and to multiply the FIR filter 2 304 configuration data by a time varying value generated by $SIN^2(x)$ 314 to generate modified FIR filter 304 2 coefficients. In one example embodiment, multiplier 310 can operate continually on serial FIR filter 2 304 coefficients, can operate periodically on the entire set of FIR filter 2 304 coefficients, or can be configured in other suitable manners.

$COS^2(x)$ 312 can be implemented as one or more algorithms operating on an audio data processor that is configured to receive a time-varying value of X and to generate the $COS^2$ value of X for use in audio data processing. In one example embodiment, $COS^2(x)$ 312 can generate a value continuously, at predetermined intervals or in other suitable manners.

$SIN^2(x)$ 314 can be implemented as one or more algorithms operating on an audio data processor that is configured to receive a time-varying value of X and to generate the $SIN^2$ value of X for use in audio data processing. In one example embodiment, $SIN^2(x)$ 314 can generate a value continuously, at predetermined intervals or in other suitable manners.

Adder 316 can be implemented as one or more algorithms operating on an audio data processor that is configured to combine the FIR coefficients generated by multiplier 308 and multiplier 310 and to store the combined FIR filter coefficients for use by diffusion filter 102. In one example embodiment, adder 316 can store the combined FIR filter coefficients and can periodically transfer the combined FIR filter coefficients to FIR filter 302 or can be configured in other suitable manners.

Time Reverser 318 can be implemented as one or more algorithms operating on an audio data processor that is configured to time-reverse the filter coefficients. Time reversal can be done on a sample by sample basis, by simply reading the filter coefficients in reverse order or in other suitable manners.

Reverse diffusion filter 320 can be implemented as one or more algorithms operating on an audio data processor that is configured to store the inverted/time-reversed coefficients of diffusion filter 102 for processing a second audio input data stream, such as for stereo signal processing. In one example embodiment, system 100 can be augmented to process two or more audio data streams, such as a left audio data input stream and a right audio data input stream. In this example embodiment, diffusion filter 102 can be used for one of the two audio data input streams and reverse diffusion filter 320 can be used for the other, so as to create enhanced multi-stream audio data. For system configurations that include more than 2 audio data streams, such as 2.1 channel sound, 5.1 channel sound and so forth, additional FIR filters with different coefficients can be used.

Figure 4:
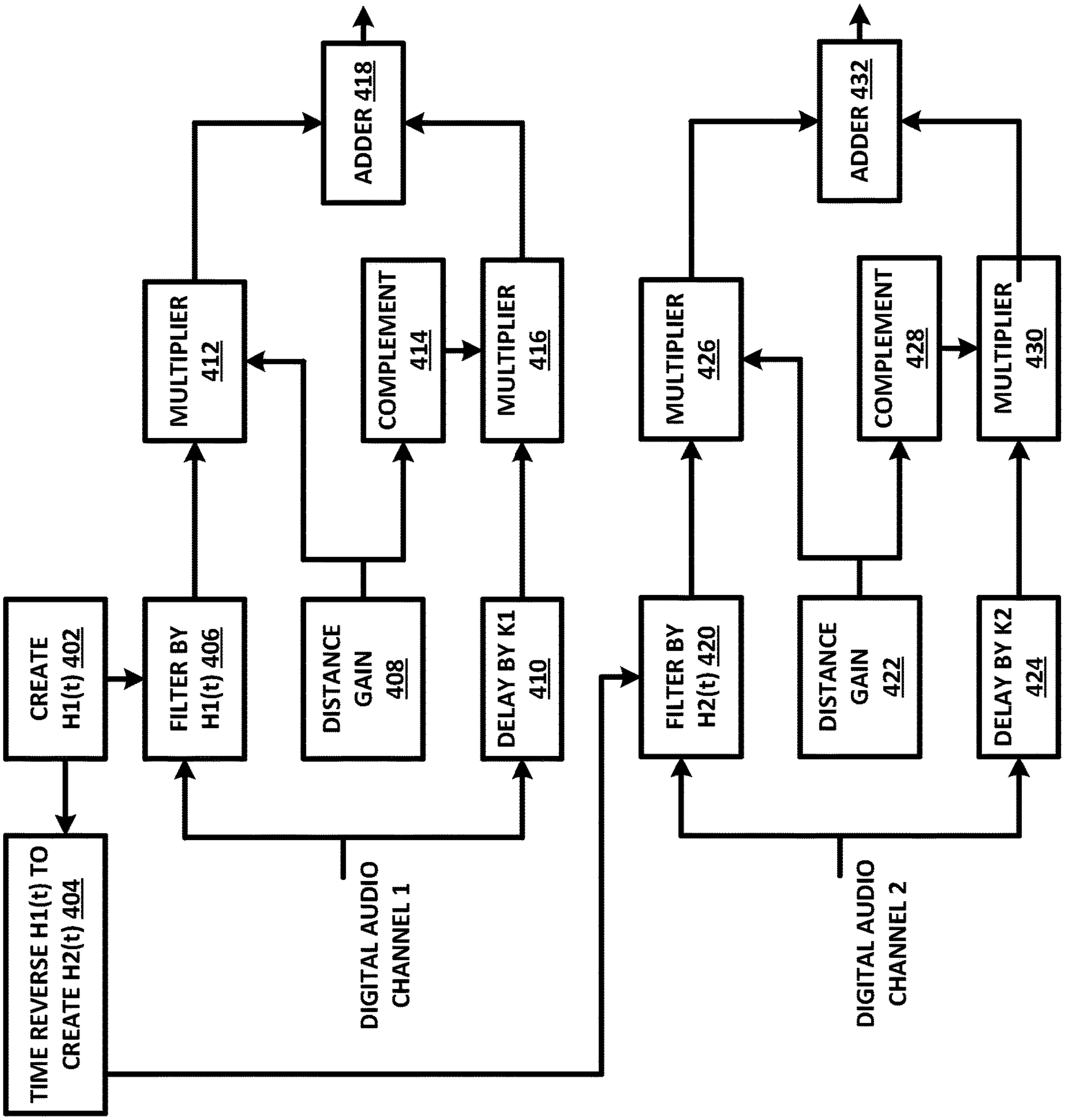
FIG. 4 is a diagram of a system for processing digitally encoded two-channel audio data to generate a diffused audio signal, in accordance with an example embodiment of the present disclosure.

FIG. 4 is a diagram of a system 400 for processing digitally encoded multi-channel audio data to generate a diffused two-channel audio signal, in accordance with an example embodiment of the present disclosure. System 400 includes create H1(*t*) 402, time reverse H1(*t*) to create H2(*t*) 404, filter by H1(*t*) 406, distance gain generator 408, delay by K1 410, complementary distance gain generator 414, multiplier 412, multiplier 416, adder 418, filter by H2(*t*) 426, distance gain generator 422, delay by K2 424, complementary distance gain generator 428, multiplier 426, multiplier 430 and adder 432, each of which can be implemented in hardware or a suitable combination of hardware and software, such as one or more algorithms operating on an audio data processor.

Create H1(*t*) 402 can be implemented as one or more algorithms operating on an audio data processor that is configured to generate filter components for processing audio data. In one example embodiment, create H1(*t*) 402 can be implemented using system 300 or in other suitable manners.

Time reverse H1(*t*) to create H2(*t*) 404 implemented as one or more algorithms operating on an audio data processor that is configured to generate filter components for processing audio data that are time inverse to the filter components of create H1(*t*) 402.

Filter by H1(*t*) 406 can be implemented as one or more algorithms operating on an audio data processor that is configured to receive digitally-encoded audio data and to perform FIR filtering of the digitally encoded audio data to generate filtered audio data. In one example embodiment, the filter applied by filter by H1(*t*) 406 can be configured to change dynamically, so as to create a time varying audio data signal that causes a listener to perceive the audio signal differently from a non-time-varying audio data signal. In this example, the perception of the listener can be that the audio data is from a natural source as opposed to a recording, such as a source that is located in a space outside of the apparent space that the listener experiences from recorded audio played over headphones. In particular, the creation of this filter specifically addresses the perception of air movement in a listening room, by moving parts of the signal both earlier and later than the mean path from the source to the listener, thereby simulating the sensation resulting from the actual acoustics in the room with moving air currents due to audience, heat, convection, HVAC, and the like. In this manner, signals can come both earlier than and later than the mean free path, which provides the desired effect. When a filter is created in this fashion, the amount of signal impairment is substantially reduced as compared to other methods, and the impairment to the audio is therefore substantially smaller.

Delay by K1 410 can be implemented as one or more algorithms operating on an audio data processor that is configured to receive digitally-encoded audio data and to delay the digitally-encoded audio data by a predetermined time period without causing any other substantive changes to the digitally-encoded audio data. In one example embodiment, the delay can be equal to the delay created by processing of the digitally-encoded audio data by filter by H1(*t*) 406 or other suitable delays.

Complementary distance gain generator 414 can be implemented as one or more algorithms operating on an audio data processor that is configured to receive a digitally encoded distance gain data value d1 from distance gain generator 408 that varies between 0 and 1 and subtracts it from 1, in order to create a complementary distance gain data value. In one example embodiment, complementary distance gain generator 414 can be used to create a processed distance gain data signal that is coordinated with an input distance gain data signal, where the two distance gain data signals are complementary for the purposes of creating a diffused audio signal. When used as shown and described herein, the complementary distance gain data signals create an effect on a listener to allow the listener to perceive that audio signals are being received from a natural external source, as opposed to be generated from a space that lies inside the listener's head.

Multiplier 412 can be implemented as one or more algorithms operating on an audio data processor that is configured to receive filtered digitally-encoded audio data from filter by H1(*t*) 406 and a digitally encoded distance gain data value d1 that varies between 0 and 1 and to multiply the two signals to generate a filtered output signal that is used to generate diffused audio data. In one example embodiment, multiplier 412 can be used to create a processed audio data signal that is coordinated with a delayed audio data signal, where the two audio data signals are complementary for the purposes of creating a diffused audio signal. When used as shown and described herein, the complementary audio data signals create an effect on a listener to allow the listener to perceive that audio signals are being received from a natural source external to the listener, as opposed to be generated from a recording.

Multiplier 416 can be implemented as one or more algorithms operating on an audio data processor that is configured to receive delayed digitally-encoded audio data from delay by K1 410 and an inverted digitally encoded distance gain data value d1 that varies between 0 and 1 and to multiply the two signals to generate a delayed output signal that is used to generate diffused audio data. In one example embodiment, multiplier 416 can be used to create a delayed audio data signal that is coordinated with a processed audio data signal, where the two audio data signals are complementary for the purposes of creating a diffused audio signal. When used as shown and described herein, the complementary audio data signals create an effect on a listener to allow the listener to perceive that audio signals are being received from a natural source external to the listener, as opposed to be generated from a recording. As the gain from the filtered version increases, and the gain from the delayed version is reduced, the sensation of the listener is of the source becoming more and more distant. Other processing, not in the scope of this patent, also may create a sense of distance at far distances, however the diffusion process can be used to assure that the source sounds as if it is outside of the headphone listener's head.

Adder 418 can be implemented as one or more algorithms operating on an audio data processor that is configured to combine complementary audio data signals to generate a diffused audio signal. When used as shown and described herein, the diffused audio signal creates an effect on a listener to allow the listener to perceive that the audio signal is being received from a natural source external to the listener, as opposed to be generated from a recording, and by varying 'd1' to change the perceived distance.

Filter by H2(*t*) 420 can be implemented as one or more algorithms operating on an audio data processor that is configured to receive digitally-encoded audio data and to perform FIR filtering of the digitally encoded audio data to generate filtered audio data. In one example embodiment, the filter applied by filter by H2(*t*) 420 can be configured to change dynamically, so as to create a time varying audio data signal that causes a listener to perceive the audio signal differently from a non-time-varying audio data signal. In this example, the perception of the listener can be that the audio data is from a natural source as opposed to a recording, such as a source that is located in a space outside of the apparent space that the listener experiences from recorded audio played over headphones. In particular, the creation of this filter specifically addresses the perception of air movement in a listening room, by moving parts of the signal both earlier and later than the mean path from the source to the listener, thereby simulating the sensation resulting from the actual acoustics in the room with moving air currents due to audience, heat, convection, HVAC, and the like. In this manner, signals can come both earlier than and later than the mean free path, which provides the desired effect. When a filter is created in this fashion, the amount of diffusion is substantially reduced as compared to other methods, and the impairment to the audio is therefore substantially smaller.

Delay by K2 424 can be implemented as one or more algorithms operating on an audio data processor that is configured to receive digitally-encoded audio data and to delay the digitally-encoded audio data by a predetermined time period without causing any other substantive changes to the digitally-encoded audio data. In one example embodiment, the delay can be equal to the delay created by processing of the digitally-encoded audio data by filter by H2(*t*) 420 or other suitable delays.

Complementary distance gain generator 428 can be implemented as one or more algorithms operating on an audio data processor that is configured to receive a digitally encoded distance gain data value d2 from distance gain generator 422 that varies between 0 and 1 and subtracts it from 1, in order to create a complementary distance gain value. In one example embodiment, complementary distance gain generator 428 can be used to create a processed distance gain data signal that is coordinated with an input distance data signal, where the two distance data signals are complementary for the purposes of creating a diffused audio signal. When used as shown and described herein, the complementary distance gain data signals create an effect on a listener to allow the listener to perceive that audio signals are being received from a natural external source wherein the distance can be varied, as opposed to be generated from a space that lies inside the listener's head.

Multiplier 426 can be implemented as one or more algorithms operating on an audio data processor that is configured to receive filtered digitally-encoded audio data from filter by H2(*t*) 420 and a digitally encoded distance gain data value d2 that varies between 0 and 1 and to multiply the two signals to generate a filtered output signal that is used to generate diffused audio data. In one example embodiment, multiplier 426 can be used to create a processed audio data signal that is coordinated with a delayed audio data signal, where the two audio data signals are complementary for the purposes of creating a diffused audio signal. When used as shown and described herein, the complementary audio data signals create an effect on a listener to allow the listener to perceive that audio signals are being received from a natural source external to the listener, as opposed to be generated from a recording.

Multiplier 430 can be implemented as one or more algorithms operating on an audio data processor that is configured to receive delayed digitally-encoded audio data from delay by K2 424 and an inverted digitally encoded distance gain data value d2 that varies between 0 and 1 and to multiply the two signals to generate a delayed output signal that is used to generate diffused audio data. In one example embodiment, multiplier 430 can be used to create a delayed audio data signal that is coordinated with a processed audio data signal, where the two audio data signals are complementary for the purposes of creating a diffused audio signal. When used as shown and described herein, the complementary audio data signals create an effect on a listener to allow the listener to perceive that audio signals are being received from a natural source external to the listener, as opposed to be generated from a recording. As the gain from the filtered version increases, and the gain from the delayed version is reduced, the sensation of the listener is of the source becoming more and more distant. Other processing, not in the scope of this patent, also may create a sense of distance at far distances, however the diffusion process can be used to assure that the source sounds as if it is outside of the headphone listener's head.

Adder 432 can be implemented as one or more algorithms operating on an audio data processor that is configured to combine complementary audio data signals to generate a diffused audio signal. When used as shown and described herein, the diffused audio signal creates an effect on a listener to allow the listener to perceive that the audio signal is being received from a natural source external to the listener, as opposed to be generated from a recording.

In operation, system 400 improves the perceived quality of digitally-encoded audio data by creating a diffused audio signal that the user perceives as being similar to audio data from a natural source external to the listener, and outside the headphone listener's head. For example, a user listening to audio over headphones typically experiences the audio source as being in the space "between the ears," as opposed to being in the space outside of the user's head. While this spatial effect does not make the audio listening experience unpleasant, it is different from what the user is used to. In addition, by moving the apparent spatial location of the audio data to a different location than the listener would otherwise experience, it is possible to combine audio signals with different perceived spatial locations, which can objectively increase the quality of the listening experience.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for processing audio data, comprising:

a diffusion data filter coupled to a source of digital audio data, the diffusion data filter configured to generate filtered audio data from the digital audio data, wherein the diffusion data filter simulates an arrival time being modified to be both before and after a center point of a time-varying data filter while maintaining a near-flat frequency response;

a delay coupled to the source of the digital audio data, the delay configured to delay the digital audio data by a predetermined amount;

a first multiplier configured to multiply the filtered audio data by a distance gain parameter to generate a first intermediate output;

a second multiplier configured to multiply the delayed digital audio data by a complementary distance gain parameter to generate a second intermediate output; and a first adder configured to add the first intermediate output and the second intermediate output to generate an audio output.

2. The system of claim 1 wherein the diffusion data filter comprises a sinusoidal variation component configured to generate the time-varying data filter from two or more filters.

3. The system of claim 2, wherein a first stereo audio channel is processed by the time-varying data filter and a second stereo audio channel is processed by a time reverse of the time-varying data filter.

4. The system of claim 1 further comprising:

a first filter;

a first sinusoidal variation component configured to generate a first time-varying signal; and a third multiplier configured to receive the first filter and the first time-varying signal and to multiply the first filter and the first time-varying signal to generate a first filter output.

5. The system of claim 4 further comprising:

a second filter;

a second sinusoidal variation component configured to generate a second time-varying signal; and a fourth multiplier configured to receive the second filter and the second time-varying signal and to multiply the second filter and the second time-varying signal to generate a second filter output.

6. The system of claim 5 further comprising a second adder configured to receive the first filter output and the second filter output and to add the first filter output to the second filter output to generate the diffusion data filter.

7. The system of claim 6 further comprising a time reversal system coupled to the diffusion data filter and configured to reverse a time value of the diffusion data filter to generate a reverse diffusion data filter.

8. The system of claim 1, wherein a first stereo audio channel is processed by the diffusion data filter and a second stereo audio channel is processed by a time reverse of the diffusion data filter.

9. A method for processing audio data, comprising:

generating filtered audio data from digital audio data by simulating an arrival time that is modified to be both before and after a center point of a time-varying data filter while maintaining a near-flat frequency response;

delaying the digital audio data by a predetermined amount;

multiplying the filtered audio data by a distance gain parameter to generate a first intermediate output;

multiplying the delayed digital audio data by a complementary distance gain parameter to generate a second intermediate output; and adding the first intermediate output and the second intermediate output to generate an audio output.

10. The method of claim 9 wherein generating the filtered audio data comprises a generating the time-varying data filter from two or more filters.

11. The method of claim 10, wherein a first stereo audio channel is processed by the time-varying data filter and a second stereo audio channel is processed by a time reverse of the time-varying data filter.

12. The method of claim 9 wherein generating the filtered audio data comprises:

generating a first time-varying signal; and multiplying a first filter and the first time-varying signal to generate a first filter output.

13. The method of claim 12 wherein generating the filtered audio data comprises:

generating a second time-varying signal; and multiplying a second filter and the second time-varying signal to generate a second filter output.

14. The method of claim 13 further comprising adding the first filter output to the second filter output to generate a diffusion data filter.

15. The method of claim 14 further comprising reversing a time value of the diffusion data filter to generate a reverse diffusion data filter.

16. The method of claim 9, further comprising processing a first stereo audio channel by a diffusion data filter and processing a second stereo audio channel by a time reverse of the diffusion data filter.

* * * * *